United States Patent
Park et al.

(10) Patent No.: US 10,764,099 B2
(45) Date of Patent: Sep. 1, 2020

(54) METHOD AND APPARATUS FOR CONFIGURING AND DETECTING CYCLIC PREFIX LENGTH IN CELL SUPPORTING MULTIPLE SUBCARRIER SPACINGS

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/317,102

(22) PCT Filed: Sep. 22, 2017

(86) PCT No.: PCT/KR2017/010510
§ 371 (c)(1),
(2) Date: Jan. 11, 2019

(87) PCT Pub. No.: WO2018/056767
PCT Pub. Date: Mar. 29, 2018

(65) Prior Publication Data
US 2019/0245727 A1   Aug. 8, 2019

(30) Foreign Application Priority Data

Sep. 23, 2016   (KR) .................. 10-2016-0122503
Sep. 15, 2017   (KR) .................. 10-2017-0118880

(51) Int. Cl.
*H04L 27/26* (2006.01)

(52) U.S. Cl.
CPC ................ *H04L 27/2607* (2013.01)

(58) Field of Classification Search
CPC .................... H04L 27/2607; H04L 5/003
USPC ................................... 375/260, 316
See application file for complete search history.

(56) References Cited

U.S. PATENT DOCUMENTS

| | | | |
|---|---|---|---|
| 2012/0039292 A1 | 2/2012 | Lee et al. | |
| 2017/0094547 A1* | 3/2017 | Yum | H04W 72/04 |
| 2018/0123849 A1* | 5/2018 | Si | H04J 11/0076 |
| 2018/0317212 A1* | 11/2018 | Kazmi | H04W 56/00 |
| 2019/0150110 A1* | 5/2019 | Ko | H04W 56/001 370/350 |
| 2019/0215790 A1* | 7/2019 | Kim | H04W 56/0015 |

(Continued)

OTHER PUBLICATIONS

Huawei et al., "A common synchronization signal for a NR carrier supporting different numerologies", R1-167217, 3GPP TSG RAN WG1 Meeting #86, Gothenburg, Sweden, Aug. 22-26, 2016, pp. 1-7.

(Continued)

*Primary Examiner* — Tesfaldet Bocure
(74) *Attorney, Agent, or Firm* — IP Legal Services, LLC (57) ABSTRACT

The present embodiments relate to a method for configuring a cyclic prefix for a next generation/5G radio access network (referred to as new radio (NR)) about which 3GPP has begun discussions. According to the present embodiments, a base station configures cyclic prefix (CP) lengths for secondary numerology except for reference numerology and sets, through RRC signaling, the values of the CP lengths configured for the secondary numerology, thereby enabling a terminal to detect the CP lengths for the secondary numerology in a cell supporting mixed numerology.

8 Claims, 4 Drawing Sheets

(56) References Cited

U.S. PATENT DOCUMENTS

2019/0268205 A1* 8/2019 Shin ................. H04L 5/0023
2019/0372816 A1* 12/2019 Si ..................... H04J 11/0073

OTHER PUBLICATIONS

Nokia et al., "On System Design for Multiple Numerologies—Initial Access", R1-167258, 3GPP TSG-RAN WG1 Meeting #86, Gothenburg, Sweden, Aug. 22-26, 2016, pp. 1-6.
Samsung, "Discussion on numerology aspects of NR synchronization signal", R1-166795, 3GPP TSG RAN WG1 Meeting #86, Gothenburg, Sweden, Aug. 22-26, 2016, pp. 1-5.
LG Electronics, "Discussion on alignment for different numerology multiplexing", R1-166878, 3GPP TSG RAN WG1 Meeting #86, Gothenburg, Sweden Aug. 22-26, 2016, pp. 1-5.
Interdigital Communications, "UE Support for Multiple Numerologies with NR", R1-167328, 3GPP TSG-RAN WG1 #86, Göteborg, Sweden Aug. 22-26, 2016, pp. 1-4.
Jaakko Vihriala et al., "Numerology and Frame Structure for 5G Radio Access", 2016 IEEE 27th Annual International Symposium on Personal, Indoor, and Mobile Radio Communications (PIMRC): Workshop: Inclusive Radio Communication Networks for 5G and Beyond (IRACON2016), pp. 1-5.
European Patent Office, European Search Report of corresponding EP Patent Application No. 17853481.4, Jan. 24, 2020.

* cited by examiner

METHOD AND APPARATUS FOR CONFIGURING AND DETECTING CYCLIC PREFIX LENGTH IN CELL SUPPORTING MULTIPLE SUBCARRIER SPACINGS

CROSS REFERENCE TO RELATED APPLICATIONS

This application is a National Stage Patent Application of PCT International Patent Application No. PCT/KR2017/010510 (filed on Sep. 22, 2017) under 35 U.S.C. § 371, which claims priority to Korean Patent Application Nos. 10-2016-0122503 (filed on Sep. 23, 2016) and 10-2017-0118880 (filed on Sep. 15, 2017), the teachings of which are incorporated herein in their entireties by reference.

TECHNICAL FIELD

The present disclosure relates to a method for configuring a cyclic prefix in a next-generation/5G radio access network (hereinafter, referred to as a new radio (NR)) which has been discussed in the 3rd generation partnership project (3GPP).

BACKGROUND ART

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for a new radio (NR). It is required to design the NR not only to provide an improved data transmission rate as compared with the long term evolution (LTE), but also to meet various requirements in detailed and specific usage scenarios.

An enhanced mobile broadband (eMBB), a massive machine-type communication (mMTC), and an ultra-reliable and low latency communication (URLLC) are proposed as representative usage scenarios of the NR. In order to meet the requirements of the individual scenarios, it is required to design NR to have flexible frame structures, compared with the LTE.

On the other hand, in orthogonal frequency-division multiplexing (OFDM)-based wireless communication systems, a cyclic prefix is included in the front of an OFDM symbol in order to cope with multi-path delay spread. In the case of the LTE/LTE-Advanced system, the cyclic prefix is included in front of each OFDM symbol.

Specifically, in the LTE/LTE-Advanced system, a base station configures i) OFDM based resource elements with the same subcarrier spacing and symbol duration and ii) the cyclic prefix according to a cell size and a delay spread characteristic by. Then, a user equipment performs detection of the length of the cyclic prefix configured in any cell through a process of adjusting time/frequency synchronization for the corresponding cell after reception of a synchronization signal.

In this regard, as the NR system supports multiple numerologies in a cell to support various usage scenarios, there is required the scheme for configuring the length of the cyclic prefix for a numerology different from a numerology performing the transmission of the synchronization signal.

DETAILED DESCRIPTION OF THE INVENTION

Technical Problem

It is an object of the present disclosure to provide a method for configuring the length of the cyclic prefix and informing the user equipment of the length of the cyclic prefix in the cell supporting various mixed numerologies of the NR system.

Technical Solution

An aspect of the present disclosure is to provide a method of configuring a length of a cyclic prefix by a base station in a cell supporting a plurality of subcarrier spacings. The method may include a first cyclic prefix length, as a length of a cyclic prefix for a first subcarrier spacing where a synchronization signal is transmitted, configuring a second cyclic prefix length as a length of a cyclic prefix for one or more second subcarrier spacings except for the first subcarrier spacing, and transmitiing a value indicating the the cyclic prefix lengths for the second subcarrier spacings.

Another aspect of the present disclosure is to provide a method of detecting a length of a cyclic prefix by a user equipment in a cell supporting a plurality of subcarrier spacings. The method may include receiving a synchronization signal via a first subcarrier spacing, receiving data or signal via one or more second subcarrier spacings except for the first subcarrier spacing, and receiving a value indicating a second cyclic prefix length for the second subcarrier spacing.

Further another aspect of the present disclosure is to provide a base station configuring a length of a cyclic prefix in a cell supporting a plurality of subcarrier spacings. The base station may include a controller configured to configure i) a first cyclic prefix length for a first subcarrier spacing where a synchronization signal is transmitted and ii) a second cyclic prefix lengths for one or more second subcarrier spacings except for the first subcarrier spacing, and a transmitter configured to transmit, to a user equipment, a value indicating the second cyclic prefix length for the second subcarrier spacings.

Yet another aspect of the present disclosure is to provide a user equipment detecting a cyclic prefix in a cell supporting a plurality of subcarrier spacings. The user equipment may include a receiver configured to receive i) a synchronization signal via a first subcarrier spacing and ii) data or signal via one or more second subcarrier spacings except for the first subcarrier spacing, and a controller configured to detect a cyclic prefix length based on a value indicating a cyclic prefix length for the second subcarrier spacing.

Effects of the Invention

In accordance with embodiments of the present disclosure, it is provided that the base station may be able to configure a cyclic prefix length of one numerology different from that of the other numerologies for transmitting a synchronization signal and to inform a user equipment of a value of the configured cyclic prefix length in the cell supporting a mixed numerology (e.g., multiple numerologies).

MODE FOR CARRYING OUT THE INVENTION

Hereinafter, embodiments of the present disclosure will be described in detail with reference to the accompanying drawings. In adding reference numerals to elements in each drawing, the same elements may be designated by the same reference numerals although the same elements are shown in different drawings. Further, in the following description of the present disclosure, detailed descriptions of functions and configurations related to the known structure may be omitted when it is determined that the descriptions may obscure the gist of the present disclosure.

In the present disclosure, a wireless communication system refers to a system for providing various communication services such as a voice service, a packet data service, etc. The wireless communication system may include a user equipment (UE) and a base station (BS).

The UE may be a comprehensive concept that indicates a terminal for use in wireless communication. For example, the UE may include a UE used for wideband code division multiple access (WCDMA), long term evolution (LTE), high speed packet access (HSPA), international mobile telecommunications (IMT)-2020 (5G or new radio), or the like. Further, the UE may include a mobile station (MS), a user terminal (UT), a subscriber station (SS), a wireless device, or the like used for a global system for mobile communications (GSM).

The BS or a cell generally refers to a station that performs communication with a UE. The BS or the cell inclusively means all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the above-described various cells has a BS that controls a corresponding cell, and thus, the BS may be construed in two ways. 1) The BS may be a device that provides the megacell, the macrocell, the microcell, the picocell, the femtocell, and the small cell in association with a wireless area, or 2) the BS may indicate the wireless area itself. In item 1), the BS may be any device providing a predetermined wireless area i) by interacting with another device and controlled by an identical entity a predetermined wireless area or ii) by cooperating with each other. Based on a configuration type of the wireless area, the BS may be a point, a transmission/reception point, a transmission point, a reception point, or the like. In item 2), the BS may be the wireless area itself that receives or transmits a signal from a terminal or a neighboring BS.

In the present disclosure, the cell may refer to the coverage of a signal transmitted from the transmission/reception point, a component carrier having the coverage of the signal transmitted from the transmission/reception point (transmission point or transmission/reception point), or the transmission/reception point itself.

In the present disclosure, the user equipment and the BS are used as two (uplink and downlink) inclusive transceiving subjects to embody the technology and technical concepts described in the specifications, however, may not be limited to a specific term or word.

Here, a term uplink (UL) refers to a scheme for the UE to transceive data to the BS, and a term downlink (DL) refers to a scheme for the BS to transceive data to the UE.

UL transmission and DL transmission may be performed using i) a time division duplex (TDD) scheme that performs transmission based on different times, ii) a frequency division duplex (FDD) scheme that performs transmission based on different frequencies, or iii) a mixed scheme of the TDD and FDD schemes.

Further, a related standard may define that a UL and a DL are configured based on a single carrier or a pair of carriers in the wireless communication system.

The UL and the DL may transmit control information through a control channel, such as a physical DL control channel (PDCCH), physical UL control channel (PUCCH), and the like. The UL and the DL may transmit data through a data channel, such as a physical DL shared channel (PDSCH), physical UL shared channel (PUSCH), and the like.

The DL may refer to communication or a communication path from a multi-transmission/reception point to the terminal, and the UL may refer to communication or the communication path from the terminal to a multi-transmission/reception point. In the DL, a transmitter may be a part of multiple transmission/reception points, and a receiver may be a part of the terminal. In the UL, a transmitter may be a part of the terminal, and a receiver may be a part of multiple transmission/reception points.

Hereinafter, signal transmission and reception through the PUCCH, the PUSCH, the PDCCH, or the PDSCH may be expressed as the transmission and reception of the PUCCH, the PUSCH, the PDCCH, or the PDSCH.

Meanwhile, higher layer signaling includes a radio resource control (RRC) signaling that transmits RRC information including an RRC parameter.

The BS performs DL transmission to the terminals. The BS may transmit a physical DL control channel for i) transmitting DL control information such as scheduling required to receive a DL data channel and ii) scheduling approval information for transmission on a UL data channel. Herein, the physical DL control channel is a main physical channel for unicast transmission. Hereinafter, transmission and reception of a signal through each channel will be described as transmission and reception of a corresponding channel.

Varied multiple access schemes may be unrestrictedly applied to the wireless communication system. For example, various multiple access schemes may include such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, and the like. Here, NOMA includes sparse code multiple access (SCMA), low cost spreading (LDS), and the like.

Embodiments of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and UMB.

In the present disclosure, an machine type communication (MTC) terminal refers to a terminal that is low cost (or low complexity), a terminal that supports coverage enhancement, or the like. Alternatively, in the present disclosure, the MTC terminal refers to a terminal that is defined in a predetermined category for maintaining low costs (or low complexity) and/or coverage enhancement.

In other words, in the present specifications, the MTC terminal may refer to a newly defined 3GPP Release-13 low cost (or low complexity) UE category/type which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type. Alternatively, the MTC terminal may refer to a further Enhanced MTC terminal defined in Release-14.

In the present disclosure, a narrowband Internet of Things (NB-IoT) terminal refers to a terminal supporting radio access for cellular IoT. NB-IoT technology is aimed at indoor coverage improvement, support for large-scale low-speed terminals, low latency sensitivity, very low terminal costs, low power consumption, and optimized network architecture.

An eMBB, mMTC, and URLLC are proposed as typical usage scenarios for NR which have been under discussion in the 3GPP in recent years.

In the present disclosure, a frequency, a frame, a subframe, a resource, a resource block, a region, a band, a sub-band, a control channel, a data channel, a synchronization signal, various reference signals, various signals, and various messages associated with NR may be interpreted as meanings used in the past or present or as various meanings to be used in the future.

NR (New Radio)

Recently, the 3GPP has approved the "Study on New Radio Access Technology", which is a study item for research on next-generation/5G radio access technology. On the basis of such a study item, the 3GPP have started discussions about frame structure, channel coding & modulation, waveform, multiple access scheme, etc.

It is required to design the NR not only to provide an enhanced data transmission rate as compared with that of LTE/LTE-Advanced, but also to meet various requirements for detailed and specific usage scenarios. In particular, the eMBB, the mMTC, and the URLLC have been discussed as representative usage scenarios of the NR, and it has been required to design more flexible frame structures as compared with those for LTE/LTE-Advanced in order to meet the requirements of each usage scenario.

Specifically, the eMBB, the mMTC, the URLLC are considered as representative usage scenarios of the NR. Since each usage scenario imposes a different requirement of data rates, latency, coverage, etc., many discussions have been conducted for a technique of efficiently multiplexing radio resource units based on different types of numerology (e.g., a subcarrier spacing (SCS), a subframe, a transmission time interval (TTI), etc.) in order to efficiently satisfy requirements according to usage scenarios through a frequency band of any NR system.

For example, there is a need to support a structure of 1 ms subframe (or 0.5 ms slot) based on 15 kHz subcarrier spacing in the same way as the typical LTE, a structure of 0.5 ms subframe (or 0.25 ms slot) based on 30 kHz subcarrier spacing, and a structure of 0.25 ms subframe (0.125 ms slot) based on 60 kHz subcarrier spacing over a single NR frequency band.

There has been discussed on how to configure a subframe made up of X OFDM symbols (e.g., X=14 or 7, or any other natural number) or a slot made up of Y OFDM symbols (Y=14 or 7, or any other natural number), define mini-slots made up of Z OFDM symbols (s) (e.g., Any natural number satisfying Z<Y & Z<X), as a resource allocation unit in the time domain, i.e., a scheduling unit in the time domain, in any numerology, i.e., subcarrier spacing structure.

Cyclic Prefix (CP)

In an OFDM-based wireless mobile communication system, a method for responding to a delay spread according to a multi-path is used to transmit and receive a signal including the cyclic prefix in front of an OFDM symbol.

Similarly, in the LTE/LTE-Advanced system, the cyclic prefix is included in the front of each OFDM symbol. In particular, the LTE/LTE-Advanced supports two lengths of the cyclic prefixes in consideration of a delay profile according to cell deployment scenarios of various sizes.

Particularly, in relation to the cyclic prefix defined in LTE/LTE-Advanced, a part of the following 3GPP TS36.211 document should be attached.

TS36.211

6.12 OFDM Baseband Signal Generation

The time-continuous signal $s_l^{(p)}(t)$ on antenna port P in OFDM symbol 1 in a downlink slot is defined by $$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f(t - N_{CP,l} T_s)} + \sum_{k=1}^{\lceil N_{RB}^{DL} N_{sc}^{RB}/2 \rceil} a_{k^{(+)},l}^{(p)} \cdot e^{j2\pi k \Delta f(t - N_{CP,l} T_s)}$$

for $0 \leq t < (N_{CP,l} + N) \times T_s$ where $k^{(-)} = k + \lfloor N_{RB}^{DL} N_{sc}^{RB}/2 \rfloor$ and $$k^{(+)} = k + \lfloor N_{RB}^{DL} N_{sc}^{RB}/2 \rfloor - 1.$$

The variable N equals 2048 for Δf=15 kHz subcarrier spacing and 4096 for Δf=7.5 kHz subcarrier spacing.

The OFDM symbols in a slot shall be transmitted in increasing order of l, starting with l=0, where OFDM symbol l>0 starts at time $\sum_{l'=0}^{l-1}(N_{CP,l'}+N)T_s$ within the slot.

In case the first OFDM symbol(s) in a slot use normal cyclic prefix and the remaining OFDM symbols use extended cyclic prefix, the starting position the OFDM symbols with extended cyclic prefix shall be identical to those in a slot where all OFDM symbols use extended cyclic prefix.

Thus there will be a part of the time slot between the two cyclic prefix regions where the transmitted signal is not specified.

Table 6.12-1 lists the value of $N_{CP,l}$ that shall be used. Note that different OFDM symbols within a slot in some cases have different cyclic prefix lengths.

TABLE 6.12-1

| OFDM parameters | | |
|---|---|---|
| Configuration | | Cyclic prefix length $N_{CP,l}$ |
| Normal cyclic prefix | Δf = 15 kHz | 160 for l = 0<br>144 for l = 1, 2, . . . , 6 |

TABLE 6.12-1-continued

OFDM parameters

| Configuration | | Cyclic prefix length $N_{CP, l}$ |
|---|---|---|
| Extended cyclic prefix | $\Delta f = 15$ kHz | 512 for $l = 0, 1, \ldots, 5$ |
| | $\Delta f = 7.5$ kHz | 1024 for $l = 0, 1, 2$ |

According to the numerology defined in the typical LTE/LTE-Advanced system, an OFDM signal for a normal subframe, except for a MBSFN subframe, is generated based on a single numerology. Accordingly, the OFDM-based resource elements (REs) are configured to have the same subcarrier spacing (15 kHz) and symbol duration through one subframe or slot. Furthermore, a base station or a network configures two cyclic prefix lengths for a normal CP and an extended CP according to the cell size and the delay spread characteristic.

In this regard, a LTE/LTE-Advanced user equipment detects a cyclic prefix length configured for a cell through performing time/frequency synchronization based on a received a synchronization signal (Primary Synchronization Signal (PSS)/Secondary Synchronization Signal SSS).

A mixed numerology structure t supports the multiple numerologies through one NR carrier. Such the multiple numerologies may include a reference numerology and second numerologies. For convenience of description and ease of understanding, the reference numerology may be defined as a numerology for transmitting system information such as PSS/SSS, MIB, SIB for synchronizing with a base station at NR carrier supporting the mixed numerology structure or as a numerology as a reference for defining a time interval. However, embodiments of the present disclosure are not limited thereto. When the NR system supports such a mixed numerology structure, a user equipment may be able to detect a cyclic prefix length for a reference numerology using a typical method. However, the user equipment is unable to detect cyclic prefix lengths for secondary numerologies. Accordingly, there is need for a method for configuring CP lengths for secondary numerologies and indicating the CP lengths of the secondary numerologies.

Therefore, the present disclosure introduces a method for configuring cyclic prefix lengths for an NR carrier supporting a mixed numerology structure and enabling a user equipment to indicate the configured cyclic prefix lengths according to embodiments.

As described above, in order to support the URLLC service in the NR, it is necessary to support a short scheduling unit (or TTI (Transmission Time Interval)) that may satisfy the latency boundary in the time domain. On the other hand, in the case of the eMBB or the mMTC, it is effective to apply the time domain resource allocation unit, which is slightly longer than the URLLC usage scenario, in terms of control overhead and cell coverage in defining the scheduling unit in the time domain.

As a method for satisfying various NR usage scenarios simultaneously, it is necessary to support a mixed numerology structure supporting the numerology of subcarrier spacing (e.g. larger subcarrier spacing such as 60 kHz, 120 kHa, etc.) which easily defines a short time domain resource allocation unit suitable for the URLLC and the numerology of subcarrier spacing (15 kHz for eMBB or 3.75 kHz for the mMTC) suitable for the eMBB and the mMTC by a single NR carrier.

For example, when any NR carrier is configured through a band below 6 GHz, there is a need to support a structure of 1 ms subframe composed of 14 OFDM symbols (or 0.5 ms slot composed of 7 OFDM symbols) based on 15 kHz subcarrier spacing suitable for the eMBB, and a structure of 0.25 ms subframe (0.125 ms slot) based on 60 kHz subcarrier spacing suitable for the URLLC over a single NR frequency band.

However, the absolute time duration of the subframe or the slot, and the number of OFDM symbols constituting the subframe or the slot are only one example, and the length of the subframe and the length of the slot for each subcarrier spacing and the number of OFDM symbols corresponding thereto may be varied.

The present disclosure introduces a method for configuring a length of a cyclic prefix (CP length) for each numerology when multiple numerologies each having a different subcarrier spacing and a corresponding subframe (or slot, mini-slot) are supported through one NR frequency band.

It has been considered that a baseline numerology of NR has a scaling factor of fc=$2^m$*15 kHz as a subcarrier spacing (fc) supported over any NR carrier. In particular, it has been considered a candidate value of the m is one of 0, 1, 2, 3, 4, and 5 (m=0, 1, 2, 3, 4, 5). In addition to the numerologies with the corresponding subcarrier spacing values, it has been considered whether to support a numerology with a subcarrier spacing value of 3.75 kHz, which is less than 15 kHz, taking into account the usage case of the mMTC.

In the present disclosure, a numerology having a subcarrier spacing of 15 kHz will be referred to as N0, for convenience of description and ease of understanding. Furthermore, according to the m values (m=1, 2, 3, 4, 5), numerologies with subcarrier spacings of 30, 60, 120, 240, and 480 kHz will be referred to as N1, N2, N3, N4, and N5, respectively. In addition, a numerology having a subcarrier spacing of 3.75 kHz for the mMTC will be referred to as Nmtc. However, embodiments of the present disclosure are not limited thereto. For example, the embodiments of the present disclosure may be applied to a numerology having a subcarrier spacing value different from the above.

In addition, a length of a cyclic prefix or a CP length described in the present disclosure denotes an absolute time interval that constitutes the corresponding cyclic prefix, not the number of digital samples for the analog radio signal constituting the cyclic prefix.

For example, a sampling time (Ts=1/fc) of a subcarrier spacing of 15 kHz is two times of a sampling time of a subcarrier spacing of 30 kHz. Accordingly, the absolute time interval of subcarrier spacing of 15 kHz is two times longer than the time interval of 30 kHz subcarrier spacing for constructing each cyclic prefix when each cyclic prefix is made up of the same number of samples.

Point 1. Definition of Default CP Length & Configurable CP Length

Similar to LTE/LTE-Advanced, multiple CP lengths for multiple numerologies may be defined according to the usage scenario and the cell deployment scenario as described above.

However, such multiple CP lengths may be divided into a default CP length set and a configurable CP length set. The default CP length set includes CP lengths configurable for a reference numerology in a NR carrier, and the configurable CP length set includes CP lengths configurable for secondary numerologies in a NR carrier.

Alternatively, the default CP length set may be determined according to a frequency band (e.g. below 6 GHz vs.

sub-6 GHz vs. over 6 GHz, etc.) in which the corresponding NR carrier is configured, regardless of the reference numerology.

The default CP length set may be defined to include two different default CP lengths, such as a normal default cyclic prefix length and an extended default cyclic prefix length.

In this case, a ratio of the normal default cyclic prefix length and the extended default cyclic prefix length based on symbol durations according to a subcarrier spacing of a corresponding numerology may be defined to have the same ratio of a normal cyclic prefix overhead and an extended cyclic prefix overhead in the LTE/LTE-Advanced.

Alternatively, the extended default CP length may be defined to have a length of $2^k*$ the normal default CP length (k is any positive integer).

As another method for defining the default CP length set for each numerology, a default CP length set may be defined to have a normal default cyclic prefix length and a plurality of extended default CP lengths according to k value satisfying the above 2 k*the normal default CP length.

The number of extended default CP lengths and the k values may be separately configured for each numerology or be identically defined.

When the default CP length set is defined for each numerology as mentioned above, an NR user equipment may indicate the defined default CP length with a blind detection after receiving the PSS/SSS based on the reference numerology over any NR carrier.

As described, the configurable CP length set may be defined to include one or more configurable CP lengths. That is, the configurable CP length set may be a set of CP lengths that can be set by a base station for secondary numerologies when the corresponding numerology is defined as the secondary numerology in any NR carrier.

A configurable CP length set of a numerology may be configured to include all or a sub-group of default CP lengths of all numerologies defined for the NR. If a configurable CP length set of a numerology is configured to includes all of the default CP lengths of all numerologies, all numerologies share the single configurable CP length set made up of the same CP lengths.

If a configurable CP length set of a numerology may be configured to include a sub-group of the default CP lengths of all numerologies, a separate configurable CP length set may be configured for each numerology.

For example, the configurable CP length set for a numerology may include the default CP length of the corresponding numerology and the CP lengths of the other numerologies with the subcarrier spacing smaller than the corresponding numerology.

That is, i) a configurable CP length set for the numerology N0 may be defined to the same as a default CP length set defined for the numerology N0, ii) a configurable CP length set for the numerology N1 may be defined to include the default CP length set of the numerology N0 and a default CP length set of the numerology N1, and iii) a configurable CP length set for the numerology N2 may be defined to include the default CP length set of the numerology N0, the default CP length set of the numerology N1, and a default CP length set of the numerology N2. Furthermore, configurable CP length sets of the numerologies N3, N4, and N5 may be defined with the same scheme described above.

When a numerology is defined base on the subcarrier spacing of 3.75 kHz and when the subcarrier spacing of 3.75 kHz may operate as the reference numerology, the default CP length set for the subcarrier spacing of 3.75 kHz may included in the configurable CP length sets for each of the numerologies N0 to N5.

As another method for configuring a configurable CP length set of a numerology using sub-groups of default CP lengths of all numerologies, the configurable CP length set may be defined to include the default CP length set of the corresponding numerology and a default CP length set of the reference numerology.

In this case, a configurable CP length set for a numerology may be changed according to the configuration of the reference numerology.

For example, when the numerologies N1 and N2 are configured as secondary numerologies and when the numerology N0 is configured as a reference numerology in any NR carrier, i) a configurable CP length set for the numerology N1 may be defined to include the default CP length set of the numerology N0 and a default CP length set of the numerology N1, and ii) a configurable CP length set for the numerology N2 may be defined to include the default CP length set of the numerology N0 and the default CP length set of the numerology N2.

On the other hand, when the numerology N2 is configured as a secondary numerology and when the numerology N1 is configured as a reference numerology in any NR carrier, the configurable CP length set for the numerology N2 may be defined to include the default CP length set of the numerology N1 and the default CP length set of the numerology N2.

When a configurable CP length set for a numerology is defined as mentioned above, a base station may configure a CP length for a secondary numerology within a configurable CP length set and inform the user equipment of the configured CP length in order to enable the user equipment to indicate the configured CP length.

When multiple secondary numerologies are supported in a NR carrier, information for indicating a CP length set for each secondary numerology may be defined to be set in and transmitted independently through a separate information region. Or, common CP length configuration information for all secondary numerologies supported in a NR carrier may be defined to be set and transmitted. A detailed signaling method for transmitting the indication of the CP lengths of the secondary numerologies will be explained in below.

As another method for configuring CP lengths for NR secondary numerologies, a basic CP length for each numerology or a common basic CP length for all numerologies may be defined, and its scaling factor may be signaled. Accordingly, when a numerology is set as a secondary numerology in a NR carrier, it may possible to transmit CP length information of the numerology to a user equipment in order to enable the user equipment to indicate the CP length of the secondary numerology.

For example, when a scaling factor k is an exponential scaling factor, a CP length of a secondary numerology may be defined as a basic CP length*$2^k$. In addition, when the scaling factor k is a linear scaling factor, the CP length of the secondary numerology may be defined as a basic CP length*k.

A basic CP length for each numerology may be defined as a normal CP length among CP lengths included in the above-mentioned default CP length set for each numerology, or a common basic CP length for all numerologies may be defined as the normal CP length included in the default CP length set for any of numerologies (e.g. the numerology N0 or the nomology N5).

When the method for configuring the CP length through the scaling factor signaling is applied and when multiple secondary numerologies are supported in any NR carrier, information for indicating the CP length of each secondary numerology may be defined to be independently set in and transmitted through a separate information region, or information for indicating common configuration about the CP lengths for all secondary numerologies supported in the corresponding NR carrier may be defined to be configured and transmitted. The detailed signaling scheme for the indication for the CP length of the secondary numerology when a method for configuring the CP length based on such the scaling factor is applied will be explained below.

As another method for configuring a CP length for a NR secondary numerology, the CP length may be configured through performing the indication of the base numerology for configuring the CP length. For example, the CP length of a secondary numerology may be configured by informing whether the value of the CP length for the secondary numerology is configured by being scaled according to the value of the CP length for the reference numerology.

For example, when a CP length scaling indicator is configured as true, the CP length of the corresponding secondary numerology is configured by being scaled to have a time interval equal to the CP length configured for the reference numerology. When the CP length scaling indicator is configured as false, the CP length of the corresponding secondary numerology is configured to have a CP overhead equal to the CP length configured for the reference numerology.

According to the above-mentioned method for configuring the default CP length set, the default CP length set for each numerology may be configured to be a group of the CP length having the same CP overhead for each numerology. In this regard, the CP length constituting the default CP length set of the numerology N0 has the time interval twice longer than the CP length constituting to the default CP length set of the numerology N1. In this regard, when the numerology N0 is configured as the reference numerology and when the numerology N1 is configured as the secondary numerology in a NR carrier, a base station may configure the CP length scaling indicator for the numerology N1 in order to configure the CP length of the N1 and transmit the indicator to a user equipment in the corresponding cell.

When the CP length scaling indicator is configured as true, the CP length of the numerology N1 is configured to be the same as that of the numerology N0. This may mean that the CP length of the default CP set of the numerology N1 corresponding to the CP length type (e.g. the above normal vs. extended CP) configured for the reference numerology N0 is scaled twice and configured to be the CP length of the numerology N1. On the other hand, when the CP length scaling indicator is configured as false, the CP length of the default CP set of the numerology N1 corresponding to the CP length type (e.g. the above normal vs. extended CP) configured for the numerology N0 may be applied to the CP length of the numerology N1. In other words, the CP length of the numerology N1 may be configured to have the same CP overhead.

In another embodiment of the present discloser, the corresponding CP length scaling indicator may be defined as the same CP overhead indicator.

In the method for configuring a CP length of a secondary numerology based on the CP length scaling indicator or the same CP overhead indicator when multiple secondary numerologies are supported in any NR carrier, information for indicating the CP length for each secondary numerology may be independently set in and transmitted through a separate information region, or common configuration information about the CP length for all secondary numerologies supported in the corresponding NR carrier may be configured and transmitted. The detailed signaling scheme for transmitting the indication for the CP length of the secondary numerology will be explained below.

Point 2. CP Length Configuration Signaling

When a NR cell/base station/network supports the mixed numerology structure in a NR carrier constituting a NR cell, a CP length for a secondary numerology may be configured and signaled to NR user equipments in the corresponding cell.

The configuration of the CP length for the secondary numerology may be semi-static. In this case, the CP length may be configured for each user equipment and transmitted to it through UE-specific RRC signaling, or configured to be cell-specific and transmitted to the user equipments in the corresponding cell through cell-specific RRC signaling such as the MIB (Master Information Block) and the SIB (System Information Block). The configuration of the CP length for the secondary numerology may be dynamic. In this case, the CP length may be configured and transmitted in units of subframes or radio frames via the physical layer (L1)/MAC layer (L2) control channel.

Figure 1:
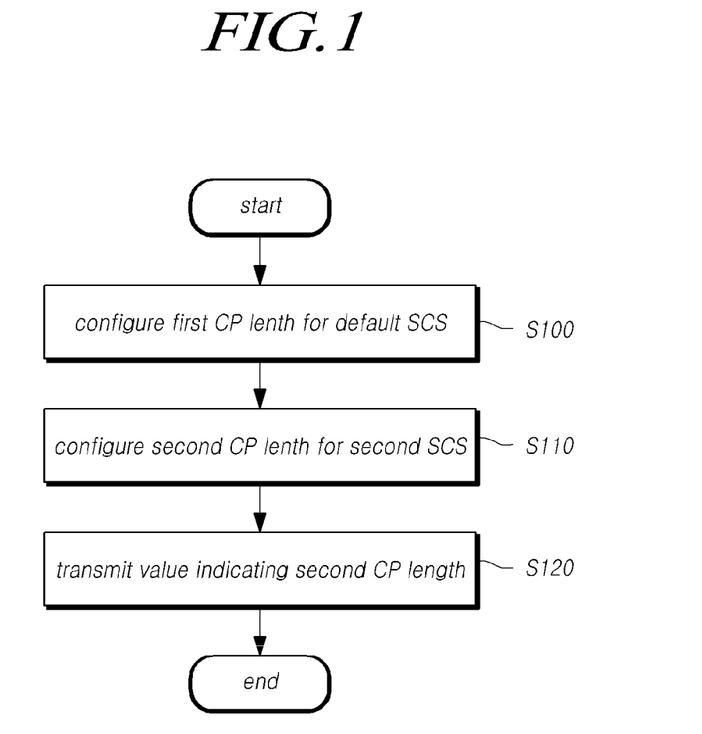
FIG. 1 is diagram illustrating a method of configuring a cyclic prefix by a base station in a cell supporting a plurality of subcarrier spacings according to at least one embodiment of the present disclosure.

FIG. 1 is diagram illustrating a method of configuring a cyclic prefix length by a base station in a cell supporting a plurality of subcarrier spacings.

Referring to FIG. 1, the base station sets a length of the cyclic prefix (e.g., cyclic prefix length or first CP length) for a first subcarrier spacing where a synchronization signal is transmitted at step S100.

The base station configures a length of a cyclic prefix (e.g., second CP length) for one or more second subcarrier spacings except for the first subcarrier spacing at step S110.

The second subcarrier spacing refers to a numerology different from the first subcarrier spacing where a synchronization signal is transmitted.

The second subcarrier spacing may be plural. In this case, cyclic prefix lengths (e.g., second CP lengths) for the one or more second subcarrier spacings are separately configured for each second subcarrier spacing.

The first cyclic prefix length of the first subcarrier spacing may constitute a default CP length set, and the second cyclic prefix lengths of the second subcarrier spacing may constitute a configurable CP length set.

A default CP length set may be defined to include two different default CP lengths, such as a normal default cyclic prefix and an extended default cyclic prefix. In this case, a ratio of the normal cyclic prefix length and the extended cyclic prefix length occupied in the symbol length for the corresponding subcarrier spacing may be defined to be the same as the ratio of the overhead of the normal cyclic prefix and the overhead of the extended cyclic prefix occupied in the symbol length defined in a cell supporting a fixed subcarrier spacing.

In other words, in a cell supporting a plurality of subcarrier spacings, such as the NR, each overhead of the normal cyclic prefix and the extended cyclic prefix is configured according to the overhead of the cyclic prefix in the cell supporting a fixed subcarrier spacing, such as the LTE/LTE-Advanced.

A configurable CP length set may be defined to include one or more configurable cyclic prefix lengths except for the set of the default CP lengths. When the subcarrier spacing is defined as the second subcarrier spacing, the configurable CP length set may refer to the group of the CP lengths configurable by the base station.

The base station transmits a value (e.g., configuration value) indicating configuration of the cyclic prefix length for the second subcarrier spacings to a user equipment at step S120.

The configuration of the cyclic prefix length for the second subcarrier spacing is semi-statically preformed, and the base station may transmit the value indicating configuration of the cyclic prefix length for the second subcarrier spacing through a UE-specific higher layer signaling (for example, RRC signaling).

The value indicating configuration of the cyclic prefix length for the second subcarrier spacing is configured for each user equipment through a cell-specific higher layer signaling such as the MIB (Master Information Block) and the SIB (System Information Block).

The configuration of the cyclic prefix length for the second subcarrier spacing is dynamically preformed, and the cyclic prefix length for the second subcarrier spacing is configured per a subframe or a radio frame through a physical layer (L1)/MAC layer (L2) control channel.

As described, according to embodiments of the present disclosure, the cyclic prefix length for the secondary numerology is configured in a cell supporting the mixed numerology structure including a reference numerology for transmitting a synchronization signal and the secondary numerologies. Furthermore, the value indicating configuration of the cyclic prefix length for the secondary numerology may be transmitted to the user equipment in order to enable the user equipment to indicate the configuration of the cyclic prefix length for the secondary numerology.

Figure 2:
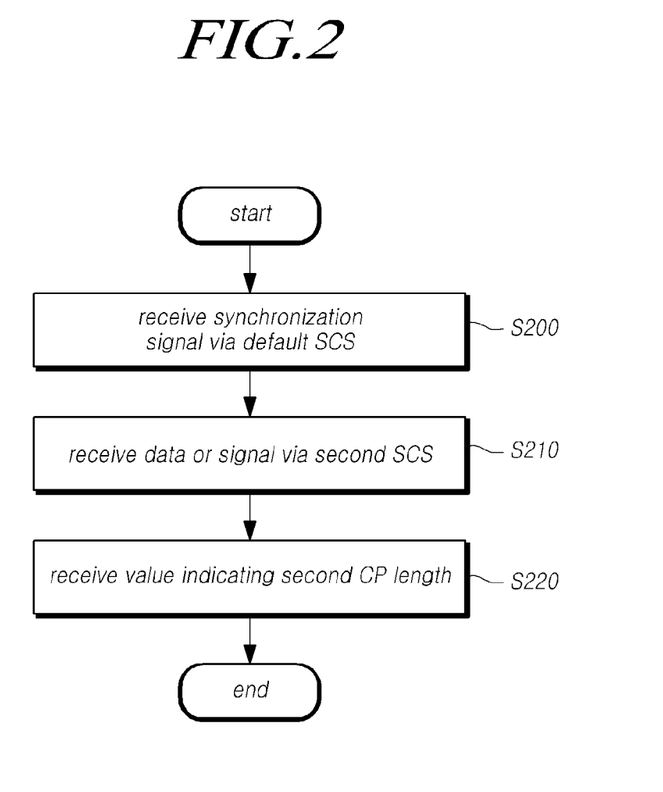
FIG. 2 is diagram illustrating a method of detecting a length of a cyclic prefix by a user equipment in a cell supporting a plurality of subcarrier spacings according to at least one embodiment of the present disclosure.

FIG. 2 is diagram illustrating a method of detecting a cyclic prefix length by a user equipment in a cell supporting a plurality of subcarrier spacings.

Referring to FIG. 2, the user equipment receives a synchronization signal via a first subcarrier spacing at step S200. The user equipment may receive data or signal via one or more second subcarrier spacings except for the first subcarrier spacing as step S210.

When the user equipment receive the synchronization signal (Primary Synchronization Signal (PSS)/Secondary Synchronization Signal SSS), the user equipment may check a value indicating configuration of the cyclic prefix length for the first subcarrier spacing through a blind detection.

The user equipment receives a value indicating configuration of the cyclic prefix length for the second subcarrier spacing at step S220. The value indicating the configuration of the cyclic prefix length for the second subcarrier spacing is checked through a UE-specific higher layer signaling transmitted from the base station.

The base station configures the cyclic prefix length (e.g., first CP length) for the first subcarrier spacing where a synchronization signal is transmitted and the cyclic prefix lengths (e.g., second CP lengths) for one or more second subcarrier spacings except for the first subcarrier spacing, and generate the value indicating configuration of the cyclic prefix lengths for the second subcarrier spacing the UE-specific higher layer signaling.

Therefore, the user equipment may be enable to check the values indicating configuration of the cyclic prefix lengths for the first and the second subcarrier spacings and detect the cyclic prefixes for the each subcarrier spacing.

Figure 3:
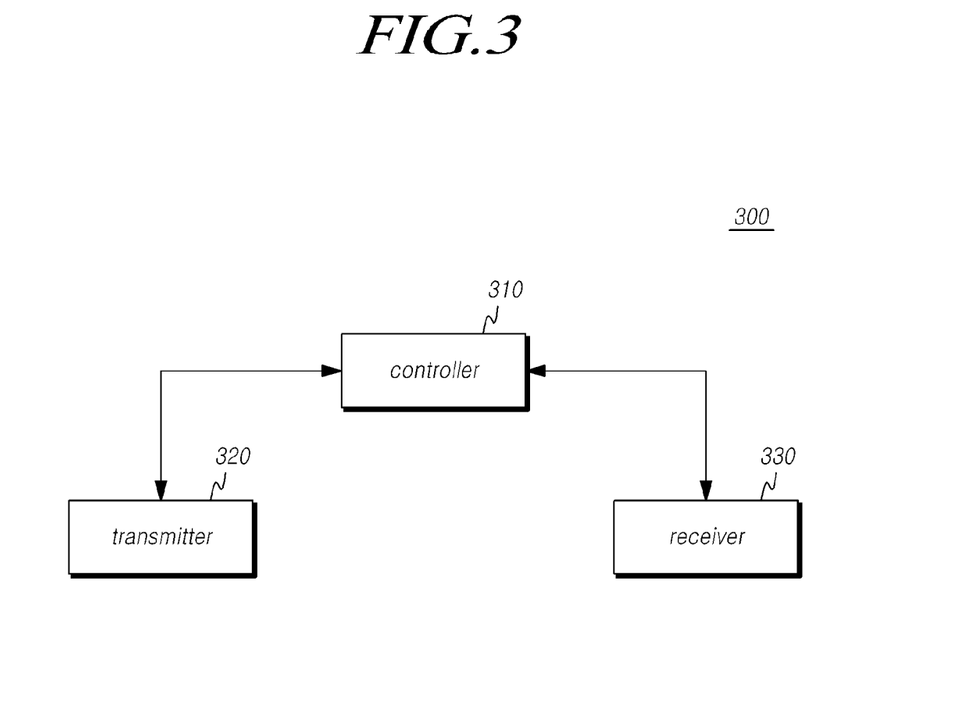
FIG. 3 is a diagram illustrating a base station according to at least one embodiment of the present disclosure.

FIG. 3 is a diagram illustrating a base station according to at least one embodiment of the present disclosure.

Referring to FIG. 3, a base station 300 according to embodiments of the present disclosure includes a controller 310, a transmitter 320, and a receiver 330.

The controller 310 is configured to control the overall operations of the base station 300 for configuring the cyclic prefix length and transmitting indication information to the user equipment in the NR carrier supporting a mixed numerology structure according to the present disclosure described above.

The transmitter 320 and the receiver 330 are used to transmit/receive signals, messages, and data necessary for carrying out the present disclosure described above, to/from the UE.

Figure 4:
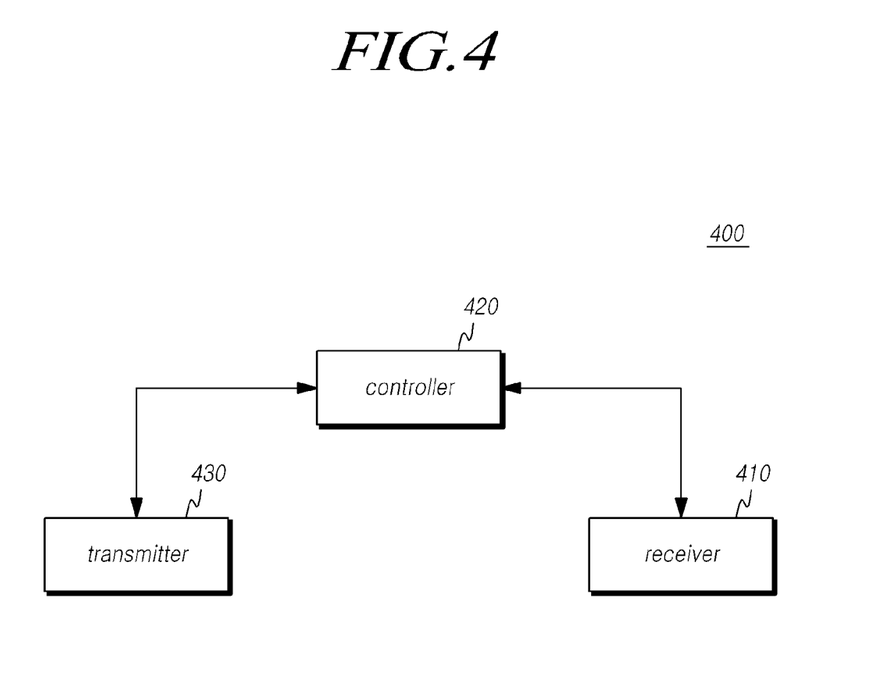
FIG. 4 is a diagram illustrating a user equipment according to at least one embodiment of the present disclosure.

FIG. 4 is a diagram illustrating a user equipment according to at least one embodiment of the present disclosure.

Referring to FIG. 4, a user equipment 400 according to embodiments of the present disclosure includes a receiver 410, a controller 420, and a transmitter 430.

The receiver 410 is configured to receive DL control information and data, messages through a corresponding channel from a BS.

The controller 420 is configured to control the overall operations of the user equipment 400 for receiving a value indicating configuration of the cyclic prefix lengths from the base station and indicating the cyclic prefix lengths configured by the base station in the NR carrier supporting a mixed numerology according to the present disclosure described above.

The transmitter 430 is configured to transmit UL control information and data, messages to the base station through a corresponding channel.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims priority under 35 U.S.C § 119(a) of Patent Application No. 10-2016-0122503, filed on Sep. 23, 2016 and Patent Application No. 10-2017-0118880, filed on Sep. 15, 2017 in Korea, the entire contents of which are incorporated herein by reference. In addition, this non-provisional application claims priorities in countries other than the U.S. for the same reason based on the Korean Patent Applications, the entire contents of which are hereby incorporated by reference.

The invention claimed is:

1. A method of detecting a cyclic prefix length by a user equipment in a cell supporting a plurality of subcarrier spacings, the method comprising:
   receiving a synchronization signal via a first subcarrier spacing;
   receiving data or signal via one or more second subcarrier spacings except for the first subcarrier spacing; and
   receiving a value indicating cyclic prefix lengths for the second subcarrier spacing,
   wherein the cyclic prefix length comprises a normal cyclic prefix length and an extended cyclic prefix length, and a ratio of the normal cyclic prefix length and the extended cyclic prefix length to a symbol length for each subcarrier spacing is configured according to a ratio of a normal cyclic prefix length and an extended cyclic prefix length to a symbol length defined in a cell supporting a fixed subcarrier spacing.

2. The method according to claim 1, wherein a cyclic prefix length of the first subcarrier spacing is configured to be the normal cyclic prefix length.

3. The method according to claim 1, wherein the cyclic prefix lengths for the one or more second subcarrier spacings are separately configured for each second subcarrier spacing.

4. The method according to claim 1, wherein the value indicating the cyclic prefix lengths for the second subcarrier spacing is received through a UE-specific higher layer signaling.

5. A user equipment for detecting a cyclic prefix in a cell supporting a plurality of subcarrier spacings, the user equipment comprising:
   a receiver configured to receive i) a synchronization signal via a first subcarrier spacing and ii) data or signal via one or more second subcarrier spacings except for the first subcarrier spacing; and
   a controller configured to detect a cyclic prefix length based on a value indicating cyclic prefix lengths for the second subcarrier spacing,
   wherein the cyclic prefix length comprises a normal cyclic prefix length and an extended cyclic prefix length, and a ratio of the normal cyclic prefix length and the extended cyclic prefix length to a symbol length for each subcarrier spacing is configured according to a ratio of a normal cyclic prefix length and an extended cyclic prefix length to a symbol length defined in a cell supporting a fixed subcarrier spacing.

6. The user equipment according to claim 5, wherein a cyclic prefix length of the first subcarrier spacing is configured to be the normal cyclic prefix length.

7. The user equipment according to claim 5, wherein the cyclic prefix lengths for the one or more second subcarrier spacings are separately configured for each second subcarrier spacing.

8. The user equipment according to claim 5, wherein the value indicating the cyclic prefix lengths for the second subcarrier spacing is received through a UE-specific higher layer signaling.

* * * * *